United States Patent [19]

Endou et al.

[11] 4,389,354
[45] Jun. 21, 1983

[54] HEATER FOR DEICING CARBURETORS

[75] Inventors: Haruo Endou, Ashigarakami; Masao Ishizuka, Odawara, both of Japan

[73] Assignee: Mikuni Kogyo Kabushiki Kaisha, Tokyo, Japan

[21] Appl. No.: 324,029

[22] Filed: Nov. 23, 1981

[30] Foreign Application Priority Data

Dec. 1, 1980 [JP] Japan .................. 55-170962[U]

[51] Int. Cl.³ ............................................. F02M 17/50
[52] U.S. Cl. ........................... 261/142; 261/DIG. 20
[58] Field of Search ............. 261/DIG. 20, 142, 39 E

[56] References Cited

U.S. PATENT DOCUMENTS

| 1,931,875 | 10/1933 | Oppenheim | 261/142 |
| 3,291,461 | 12/1966 | Pope | 261/39 E |
| 3,699,937 | 10/1972 | De Petris | 261/39 E |
| 3,987,772 | 10/1976 | McBride, Jr. | 261/142 |

FOREIGN PATENT DOCUMENTS

| 1058788 | 6/1959 | Fed. Rep. of Germany | 261/142 |
| 51-114519 | 9/1976 | Japan . | |
| 52-21339 | 2/1977 | Japan . | |

*Primary Examiner*—Tim R. Miles
*Attorney, Agent, or Firm*—Kenway & Jenney

[57] ABSTRACT

A carburetor for internal combustion engines having a by-pass port for supplying a pilot fuel to an intake passage includes an electric heater disposed adjacent the by-pass port for heating the latter and a heat-insulating material partially covering the electric heater, whereby the heater is partially exposed from the heat-insulating material to locally heat the by-pass port in a quick and effective manner.

8 Claims, 5 Drawing Figures

HEATER FOR DEICING CARBURETORS

BACKGROUND OF THE INVENTION

The present invention relates to a carburetor for internal combustion engines including a butterfly-type throttle valve, and more particularly to a carburetor having means for preventing the freezing of moisture at a pilot fuel jetting area during a low-load operation of the engine.

In the conventional carburetor of the type described, the throttle valve is partially closed with its periphery near a by-pass port for supplying a pilot fuel during a low-load operation of the engine. When a pilot fuel or a fuel-air mixture is drawn from a pilot fuel or a fuel-air mixture is drawn from a pilot fuel supply system to an intake passage during a low-load operation of the engine in a highly humid and cold atmosphere, the latent heat of evaporation of the fuel causes the freezing of moisture in the intake air to prevent air from flowing through the clearance between the inner surface of the intake passage and the periphery of the throttle valve. As a result, the fuel to air ratio fed to the engine becomes much too rich, thereby impairing the slow-speed operation or the low-load operation of the engine. Otherwise, the freezing of moisture closes the by-pass port so that the fuel-air ratio fed to the engine is made too much lean, resulting in the disorderly engine operation.

In order to prevent the freezing of moisture at the by-pass port or at the clearance between the inner surface of the intake passage and the periphery of the throttle valve, various measures have been proposed.

For example, Japanese utility model application serial No. 50-107,803, laid open to public inspection under No. 52-21,399 issued on Feb. 15, 1977, has disclosed that a heater is employed to heat the portion of the outer surface of the carburetor body at which the throttle valve and by-pass port are located. In this case, however, the heater surrounding the outer surface of the carburetor body is remote from the by-pass port and the inner surface of the intake passage so that they can not be heated to a sufficiently high temperature in a short time.

Another measure has been proposed in Japanese utility model application Ser. No. 50-33,631, laid open to public inspection under Ser. No. 51-114,519 issued on Sept. 17, 1976, in which a heat conductive member is disposed in a pilot fuel passage leading to a pilot fuel port so that one end of the heat conductive member is heated to conduct heat to the by-pass port. Though the heating material is located much nearer to the by-pass port as compared with the aforementioned Japanese utility model application, it takes a considerable time to heat the by-pass port and the inner surface of the intake passage because the heat conductive member itself is not a heater and hence can not serve as a direct heating source.

SUMMARY OF THE INVENTION

It is, therefore, the primary object of the present invention to provide an improved carburetor for an internal combustion engine of the type described having an electric heating means located near a by-pass port and a heat-insulating means for covering the electric heating means whereby the by-pass port is heated in a quick and effective manner with reduced energy to prevent a freezing at the by-pass port or the clearance between a throttle valve and the inner surface of an intake passage.

Another object of the invention is to provide a carburetor of the type described in which the heat-insulating means covers the by-pass port and/or the pilot fuel passage to enhance the heating efficiency.

A further object of the invention is to provide a carburetor of the type described in which the by-pass port is formed in a by-pass block of heat conductive material mounted in the housing so as to more quickly heat the by-pass port.

A still further object of the invention is to provide a carburetor of the type described in which the housing and the by-pass block are separated by a gap and the heat-insulating means so as not to conduct heat from the by-pass block to the housing.

Yet another object of the invention is to provide a carburetor of the type described in which a ceramic heater is employed as the electric heating means to quickly heat the by-pass port with high heat energy while the engine is in a low temperature condition.

These and other objects, features and advantages of the invention will become apparent from the following detailed description of a few preferred embodiments of the present invention with reference to the accompanying drawings.

DESCRIPTION OF THE PREFERRED EMBODIMENT

Figure 1:
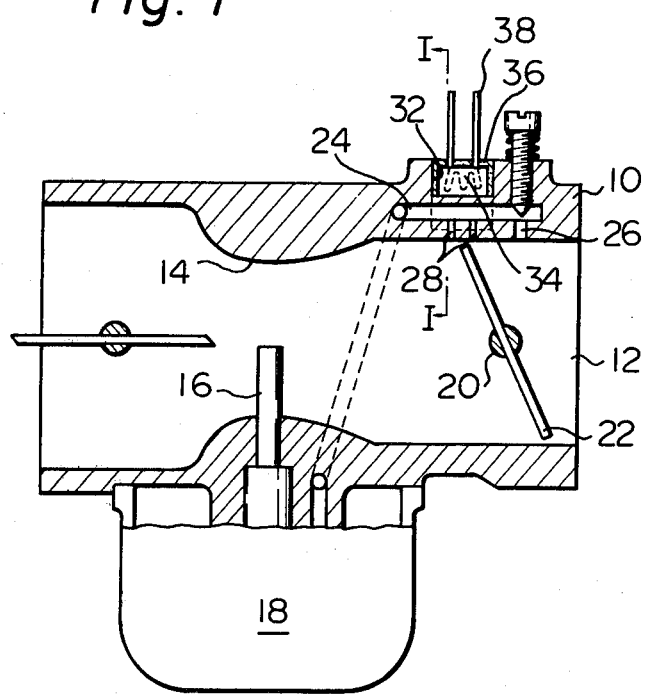
FIG. 1 is a side elevational view in vertical section of an essential part of a carburetor embodying the present invention.
Figure 2:
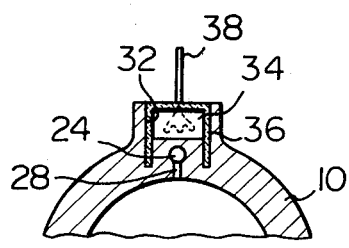
FIG. 2 is a cross-sectional view taken on line I—I of FIG. 1.

Referring to the drawings and first to FIGS. 1 and 2, there is shown a carburetor which includes a housing 10 with an intake passage 12 defined therein. The intake passage 12 is formed with a venturi 14 having a throat at which is open a main fuel nozzle 16 for supplying fuel from a fuel chamber 18 to the intake passage. In the intake passage 12 downstream of the venturi 14, a throttle valve 20 is mounted on a throttle valve shaft 22 for rotation therewith. A pilot fuel passage 24 leading to the fuel chamber 16 is formed in the housing with its terminal or downstream end connected to an idle port 26 opening to the intake passage 12. Branched from the pilot fuel passage upstream of the idle port 26 is a by-pass port 28 which has two apertures open to the intake passage 12. Formed in the wall of the housing 10 adjacent the by-pass port 28 is an outwardly opened recess 32 in which is disposed an electric heater 34 and a heat-insulating member 36 covering the electric heater at its outer and side surfaces but leaving the electric heater exposed at its inner surface so as to be in contact with the bottom surface of the recess 32. A pair of lead lines extend outwardly from the electric heater 34 through the heat-insulating member 36 to an electric power source (not shown).

The electric heater 34 is uncovered at its inner surface from the heat-insulating member 36 so as to be in direct contact with the recessed outer surface of the housing wall adjacent the by-pass port 28 whereby the by-pass ports 28 are locally and concentrically heated by the electric heater 34 with maximized efficiency. Thus, it is possible to greatly reduce the electric energy spent by the electric heater 34 as well as the time required for heating the by-pass port to a proper temperature as compared with the prior art heating means referred to the outset.

For the electric heater 34, it is preferable to employ a ceramic heater formed of a ceramic material containing barium, titanium or the like which has such an electric resistance characteristic whereby the electric resistance increases in proportion to the temperature so that the lower the temperature, the stronger is the heat generated. Accordingly, the ceramic heater enables rapid heating of the by-pass port 28 particularly at a lower temperature.

Another form of heat-insulating member, not shown, may be employed which takes an inverted cup-shaped configuration having a cylindrical wall, which covers the ceramic heater and the by-pass port as well, and a pair of appertures formed at positions corresponding to the pilot fuel passage 24 for communication thereof across the cylinder wall.

A further form of heat-insulating member may also employed which has an inverted cup-shaped configuration covering only a ceramic heater. This also attains the intended purpose, but it is preferable that a heat-insulating member has an elongated skirt or cylinder portion for covering the by-pass port and/or the pilot fuel passage.

Figure 3:
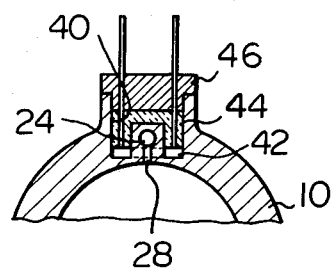
FIG. 3 is a cross-sectional view similar to FIG. 2 showing a modified form of carburetor.

FIG. 3 shows a modified form of the heater assembly. In this modification, a recess 40 having an annular bottom around the by-pass port 28 is formed in the housing 10. An annular electric heater 42 is located at the bottom of the recess 40, and an inverted cup-shaped heat-insulating member 44 is placed on the electric heater 42 so as to cover it. The inverted cup-shaped heat-insulating member 44 is provided with a pair of apertures (not shown) at positions corresponding to a pilot fuel passage 24 for communication across the heat-insulating member 44. A cap 46 is mounted in the housing 10 for closing the recess 40.

Thus, locating the electric heater 42 around the by-pass port 28 is highly effective in preventing the freezing of moisture in the by-pass port 28 and at the clearance between the throttle valve and the inner surface of the intake passage.

Figure 4:
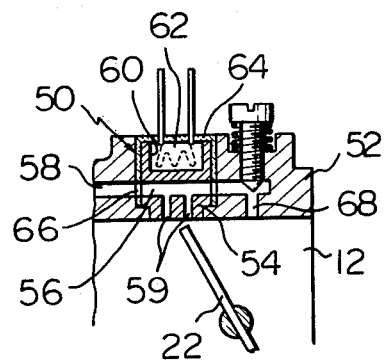
FIG. 4 is a sectional view of an essential part of a carburetor showing another modification.

FIG. 4 shows another modification in which a heater unit 50 is mounted in a housing 52, the heater unit comprising a by-pass block 54 which includes a passage 56 communicating with a pilot fuel passage 58, two by-pass ports 59 branched from the passage 56 and an outwardly opened recess 60, an electric heater 62 embedded in the recess 60 and a heat-insulating member 64 partially covering the outside of the by-pass block 54 at the location at which the electric heater is disposed. A pair of apertures 66 are formed through the heat-insulating member 64 at positions corresponding to the passage 56 for feeding the pilot fuel to the by-pass port and an idle port 68. Brass, copper, zinc, aluminium or the like which has a high heat conductive characteristics are employed as the material of the by-pass block. Therefore, in this embodiment, the by-pass block is heated more rapidly.

Figure 5:
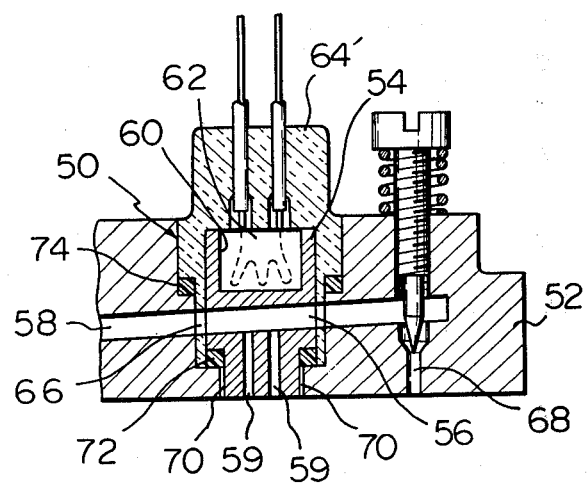
FIG. 5 is an enlarged cross-sectional view similar to FIG. 4 showing yet another modified form of carburetor.

The embodiment of FIG. 5 is similar to that of FIG. 4 with the exception that it provides a gap 70 formed between the by-pass block 54 and the housing 52 at a location adjacent to the intake passage. It is proved through an experiment that the width of the gap is desirable between 0.00138 inch and 0.00453 inch. If the width of the gap is wider than the maximum width described above, streamline flow of an intake air is put out of order by the gap. An O-ring 72 for preventing the leakage of the pilot fuel from the pilot fuel passage 58 to the gap 70 is disposed at the end of the gap 70. The heat-insulating member 64' covering the upper and side wall of the by-pass block 54 extends to the O-ring 72 so as to cover the outside of the O-ring 72. An O-ring 74 for preventing the leakage of the pilot fuel from the pilot passage 58 to the outside of the housing 52 is disposed around the heat-insulating member 64.

Therefore, the housing 52 and the by-pass block are separated by the gap 70, the O-ring 72 and the heat-insulating member 64. Accordingly, the heat energy from the electric heater 62, doesn't conduct to the housing 52 through the by-pass block 54, which enables to effectively heat the by-pass port 59.

The operation of an electric heater may be coordinated with a main switch of the engine so that the electric heater is energized in response to the closing of the main switch.

While a few presently preferred embodiments of the invention have been shown and described, it will be apparent to those skilled in the art that various changes and modifications may be made therein without departing from the spirit and the scope of the invention as defined in the appended claims.

What is claimed is:

1. In a carburetor for an internal combustion engine including a housing with an intake passage, a throttle valve in said intake passage, a pilot fuel passage communicating with a fuel chamber and a by-pass port or ports branching from said pilot fuel passage and opening to said intake passage at a location adjacent said throttle valve, the improvement comprising electrical heating means disposed in said housing, said electrical heating means comprising:
   a by-pass block mounted in said housing, the by-pass port or ports being formed in said by-pass block and the pilot fuel passage running through said by-pass block;
   a heating element disposed within said by-pass block adjacent the by-pass port or ports; and
   heat-insulating material in intimate contact with and surrounding said heating element except for the surface of said heating element facing the by-pass port or ports, said surface being free from contact with said heat insulating material.

2. The carburetor of claim 1 further comprising a gap between said by-pass block and said housing, said gap surrounding a portion of said by-pass block and cooperating with said heat-insulating means so as to isolate said block from contact with the housing.

3. The carburetor of claim 2 wherein said gap opens into the intake passage.

4. A carburetor for an internal combustion engine, according to claim 1 or 2, wherein said by-pass block is formed of a highly heat-conductive material.

5. The carburetor of claim 1 or 2 wherein said heating element is formed of a ceramic material.

6. In a carburetor for an internal combustion engine including a housing with an intake passage, a throttle valve in said intake passage, a pilot fuel passage communicating with a fuel chamber and a by-pass port or ports being branched from said pilot fuel passage and opening to said intake passage at a location adjacent said throttle valve, the improvement comprising an electric heating means disposed in a recess in the housing at a location adjacent the by-pass port or ports for heating the by-pass port and heat-insulating means disposed in said recess and covering said heating means, the surface of said heating means facing the by-pass port being uncovered from said heat-insulating means for exposure of said surface to the by-pass port, said heat-insulating means extending beyond said recess and said uncovered heating element surface to surround at least a portion of the by-pass port or ports.

7. The carburetor of claim 6 wherein said heating means comprises an annular ceramic disc encircling the by-pass port or ports.

8. A carburetor for internal combustion engines according to claim 1 or 6 wherein said heating means comprises a ceramic heater.

* * * * *